US009146863B2

(12) United States Patent
Brownlow et al.

(10) Patent No.: US 9,146,863 B2
(45) Date of Patent: Sep. 29, 2015

(54) ADDRESS TRANSLATION TABLE TO ENABLE ACCESS TO VIRTUALIZED FUNCTIONS

(75) Inventors: Sean T. Brownlow, Rochester, MN (US); Gregory M. Nordstrom, Pine Island, MN (US); Travis J. Pizel, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 751 days.

(21) Appl. No.: 12/962,841

(22) Filed: Dec. 8, 2010

(65) Prior Publication Data
US 2012/0151471 A1 Jun. 14, 2012

(51) Int. Cl.
*G06F 9/455* (2006.01)
*G06F 12/02* (2006.01)
G06F 9/44 (2006.01)
G06F 12/10 (2006.01)

(52) U.S. Cl.
CPC ........ *G06F 12/0292* (2013.01); *G06F 9/45558* (2013.01); *G06F 9/4411* (2013.01); *G06F 12/1009* (2013.01); *G06F 2009/45579* (2013.01)

(58) Field of Classification Search
None
See application file for complete search history.

(56) References Cited

U.S. PATENT DOCUMENTS

| | | | | |
|---|---|---|---|---|
| 5,860,142 | A | * | 1/1999 | Cepulis .......................... 711/202 |
| 2002/0010811 | A1 | * | 1/2002 | Arndt et al. ........................ 710/5 |
| 2002/0152334 | A1 | * | 10/2002 | Holm et al. ........................ 710/2 |
| 2006/0288130 | A1 | * | 12/2006 | Madukkarumukumana et al. ............................... 710/22 |
| 2008/0137676 | A1 | * | 6/2008 | Boyd et al. ..................... 370/419 |
| 2008/0147959 | A1 | * | 6/2008 | Freimuth et al. ............... 711/100 |
| 2008/0148005 | A1 | * | 6/2008 | Moertl et al. .................. 711/202 |
| 2009/0248937 | A1 | | 10/2009 | Solomon et al. |
| 2009/0276773 | A1 | | 11/2009 | Brown et al. |
| 2009/0313391 | A1 | | 12/2009 | Watanabe |
| 2010/0014526 | A1 | | 1/2010 | Chavan et al. |
| 2010/0082874 | A1 | | 4/2010 | Baba et al. |
| 2010/0095310 | A1 | | 4/2010 | Oshins |
| 2010/0180274 | A1 | | 7/2010 | Cherian et al. |
| 2010/0232443 | A1 | * | 9/2010 | Pandey .......................... 370/401 |
| 2010/0306416 | A1 | * | 12/2010 | Watkins ............................ 710/5 |

OTHER PUBLICATIONS

PCI-SIG—I/O Virtualization and Sharing Michael Krause and Renato Recio Published 2006.*
Multi-Root Share of Single-Root I/O Virtualization (SR-IOV) Compliant PCI Express Device Jun Suzuki, Yoichi Hidaka, Junichi Higuchi, Teruyuki Baba, Nobuharu Kami, Takashi Yoshikawa Published: Aug. 20, 2010.*
Multi Root I/O Virtualization (MR-IOV) Bernhard Homölle, Bernhard Schräder, Sven Brütt Published 2008.*

(Continued)

*Primary Examiner* — Emerson Puente
*Assistant Examiner* — Paul Mills
(74) *Attorney, Agent, or Firm* — Toler Law Group, P.C.

(57) ABSTRACT

A computer-implemented method may include assigning an address translation table to a peripheral component interconnect host bridge and determining that an input/output adapter accessible to the peripheral component interconnect host bridge is configured as a virtualized adapter to provide a plurality of virtual functions to a plurality of logical partitions. In response to determining that the input/output adapter is configured as the virtualized adapter, the address translation table may be subdivided to enable the plurality of virtual functions to access the memory of at least one logical partition of the plurality of logical partitions.

6 Claims, 7 Drawing Sheets

(56) References Cited

OTHER PUBLICATIONS

SR-IOV Networking in Xen: Architecture, Design and Implementation Yaozu Dong, Zhao Yu and Greg Rose Published 2008.*
Utilizing IOMMUs for Virtualization in Linux and Xen Muli Ben-Yehuda, Jon Mason, Orran Krieger, et al. Published: 2006.*
Evaluating Standard-Based Self-Virtualizing Devices: A Performance Study on 10 GbE NICs with SR-IOV Support Jiuxing Liu Published: Apr. 23, 2010.*
PCI Express® Base Specification Revision 3.0 pp. 29-36 Published: Nov. 10, 2010.*
PCI Express System Architecture Ravi Budruk, Don Anderson, and Tom Shanley p. 712 Published: 2003.*
What is SR-IOV? Scott Lowe Published: Dec. 2009.*
I/O Virtualization Overview Richard Solomon Published: 2009.*
Standardized but Flexible I/O for Self-Virtualizing Devices Joshua LeVasseur, Ramu Panayappan, Espen Skoglund, Christo du Toit, Leon Lynch, Alex Ward, Dulloor Rao, et al. Published: 2008.*

* cited by examiner

ADDRESS TRANSLATION TABLE TO ENABLE ACCESS TO VIRTUALIZED FUNCTIONS

I. FIELD OF THE DISCLOSURE

The present disclosure relates generally to computer systems, and more particularly, to managing virtualized functions used by a virtualized I/O adapter.

II. BACKGROUND

In a logically-partitioned computer system that uses a non-virtualized input/output (I/O) adapter, an address translation table may be allocated and assigned to an IO adapter or to a logical partition. An operating system and applications executing in the logical partition may use the address translation table to enable the non-virtualized IO adapter to perform input/output operations to the memory of the logical partition.

In a computer system that uses a virtualized I/O adapter, the virtualized I/O adapter may provide multiple virtual I/O adapters to multiple logical partitions to enable the multiple logical partitions to access the virtual functions. An address translation table that is designed for use with a non-virtualized hardware I/O adapter may be unsuitable for use with a virtualized I/O adapter. Virtualized I/O adapters may be implemented in many different ways, such as a single root input/output virtualized (SR-IOV) adapter, a multi root I/O virtualized (MR-IOV) adapter, another type of adapter that may be virtualized by a software virtualization intermediary in a hypervisor or virtual I/O hosting operating system (OS) logical partition, or any combination thereof.

SUMMARY

In a particular embodiment, a computer-implemented method includes detecting a peripheral component interconnect host bridge at a hypervisor of a computing system. The hypervisor enables a plurality of logical partitions to execute at the computing system. The computer-implemented method includes allocating an address translation table at a memory that is accessible to the hypervisor. The computer-implemented method also includes assigning the address translation table to the peripheral component interconnect host bridge. The computer-implemented method further includes determining that an input/output adapter accessible to the peripheral component interconnect host bridge is configured as a virtualized adapter to provide a plurality of virtual functions to the plurality of logical partitions, utilizing such means as single root input/output virtualization within the adapter or software virtualization of the adapter in a hypervisor or another form of software virtualization intermediary. When the input/output adapter is configured as the virtualized adapter, the computer-implemented method includes subdividing the address translation table to enable at least one virtual function of the plurality of virtual functions to access the memory of at least one of the plurality of logical partitions.

In another particular embodiment, an apparatus includes a processor and a memory to store program code. The program code is executable by the processor to enable a plurality of logical partitions to access hardware devices of a computing system. The program code is executable by the processor to detect a peripheral component interconnect host bridge. The program code is executable by the processor to allocate an address translation table at the non-transitory memory. The program code is further executable by the processor to assign the address translation table to the peripheral component interconnect host bridge. The program code is also executable by the processor to determine that an input/output adapter is accessible to the peripheral component interconnect host bridge. The program code is executable by the processor to determine that the input/output adapter is configured as a virtualized adapter. The program code is executable by the processor to provide a plurality of virtual functions to the plurality of logical partitions. In response to determining that the input/output adapter is configured as the virtualized adapter, the program code is further executable by the processor to subdivide the address translation table to enable the plurality of virtual functions to access the memory of at least one of the plurality of logical partitions via direct memory access.

In another particular embodiment, a computer program product includes a non-transitory computer usable medium having computer usable program code embodied therewith. The computer usable program code is executable by a processor to detect a peripheral component interconnect host bridge of a computing system. The computing system enables a plurality of logical partitions to execute simultaneously. The computer usable program code is executable by the processor to allocate an address translation table at a memory of the computer system. The computer usable program code is further executable by the processor to assign the address translation table to the peripheral component interconnect host bridge. The computer usable program code is also executable by the processor to determine that an input/output adapter is accessible to the peripheral component interconnect host bridge. The computer usable program code is executable by the processor to determine that the input/output adapter is configured as a virtualized adapter, or an adapter virtualized through a software virtualization intermediary, to provide a plurality of virtual functions to the plurality of logical partitions. When the input/output adapter is configured as the virtualized adapter, the computer usable program code is executable by the processor to subdivide the address translation table to enable the plurality of virtual functions to access the memory of at least one logical partition of the plurality of logical partitions.

These and other advantages and features that characterize embodiments of the disclosure are set forth in the claims listed below. However, for a better understanding of the disclosure, and of the advantages and objectives attained through its use, reference should be made to the drawings and to the accompanying descriptive matter in which there are described exemplary embodiments of the disclosure.

III. BRIEF DESCRIPTION OF THE DRAWINGS

IV. DETAILED DESCRIPTION

In a virtualized system, enabling multiple logical partitions to perform input/output (I/O) operations may include assigning each logical partition to a hardware I/O adapter. An address translation table may be created to enable the hardware I/O adapter to perform direct memory access (DMA) I/O operations to the memory of the individual logical partitions of the virtualized system. Each hardware I/O adapter may be plugged into a slot, such as a peripheral component interconnect (PCI) slot, on a motherboard. The number of available slots on the motherboard may represent a limitation as to the number of hardware I/O adapters that can be provided to logical partitions.

The number of available slots may be increased using a peripheral component interconnect (PCI)-to-PCI bridge that fans out additional slots. The additional slots may be used to accommodate additional hardware I/O adapters. Where a PCI-to-PCI bridge is used, the address translation table may be modified to enable the additional hardware I/O adapters to access the memory of the logical partitions. For example, the address translation table may be subdivided based on various aspects of the additional hardware I/O adapters, such as the physical aspects of the additional hardware I/O adapters. To illustrate, a hardware address associated with a slot of each of the I/O adapters may be used to subdivide the address translation table for use with the additional hardware I/O adapters.

Particular types of hardware I/O adapters, such as single root I/O virtualization (SR-IOV) adapters and multi root I/O virtualization (MR-IOV) adapters, may be virtualized to create and enable virtual I/O adapters (referred to herein as virtual functions) to be assigned to each logical partition. Using a virtualized I/O adapter, a single hardware I/O adapter may be capable of providing multiple virtual I/O adapters for use by multiple logical partitions. The address translation table may be subdivided based on the number or virtual aspects of the virtual I/O adapters to enable the virtual functions to access the memory of the logical partitions. For example, a specific portion of the address allocation table may be subdivided and provided to a virtual I/O adapter. A logical partition that is assigned to the I/O adapter may use the specific portion of the subdivided address allocation table to enable the virtual I/O adapter to access the memory of that logical partition.

Figure 1:
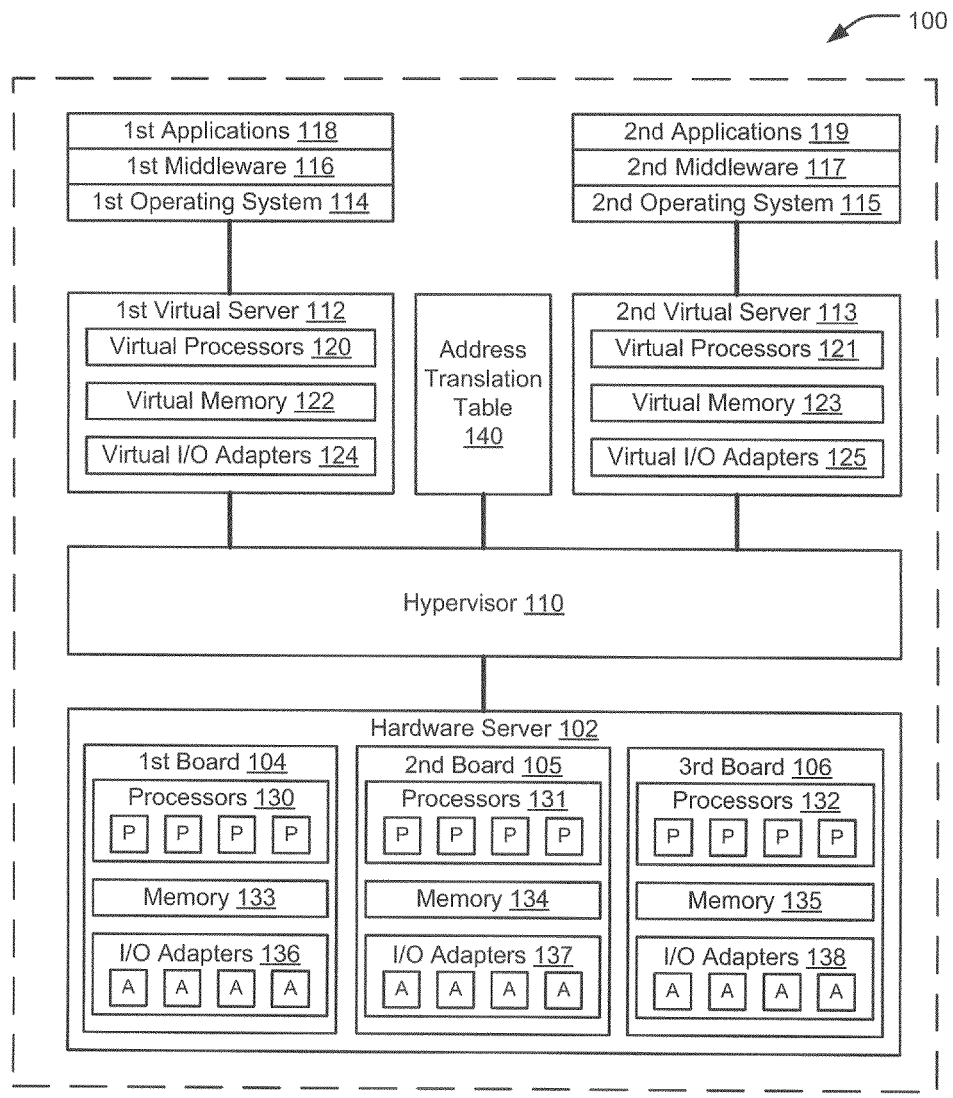
FIG. 1 is a block diagram of a first embodiment of a system that includes an address translation table to enable virtualized functions to access the memory of logical partitions.

Referring to FIG. 1, a block diagram of a first embodiment of a system that includes an address translation table to enable virtualized functions to access the memory of logical partitions is depicted and generally designated 100. The system 100 may include a hardware server 102 that is managed by a hypervisor 110. The hardware server 102 may include hardware resources, such as a first board 104, a second board 105, and a third board 106. While three boards are illustrated in FIG. 1, the number of boards may be increased or decreased based on processing considerations. The boards 104-106 may include processors 130-132, memory 133-135, and input/output (I/O) adapters 136-138. Each of the boards 104-106 may include additional hardware resources (not shown), such as specialized processors (e.g., digital signal processors, graphics processors, etc.), disk drivers, other types of hardware, or any combination thereof. The processors 130-132, the memory 133-135, and the I/O adapters 136-138 of the hardware server 102 may be managed by hypervisor 110. Each processor of the processors 130-132 may be a simultaneous multithreading (SMT)-capable processor that is capable of concurrently executing multiple different threads.

The hypervisor 110 may create and manage logical partitions, such as virtual servers 112, 113. A logical partition may be a subset of the resources of the hardware server 102 that is virtualized as a separate virtual server. Each of the virtual servers 112, 113 may have its own set of virtual resources, similar to a physical server. For example, the first virtual server 112 may include virtual processors 120, virtual memory 122, and virtual I/O adapters 124. Virtual server 113 may include virtual processors 121, virtual memory 123, and virtual I/O adapters 125. The hypervisor 110 may map the hardware of the hardware server 102 to the virtual servers 112, 113. For example, the processors 130-132 may be mapped to the virtual processors 120, 121; the memory 133-135 may be mapped to the virtual memory 122, 123, and the I/O adapters 136-138 may be mapped to the virtual I/O adapters 124-125. The hypervisor 110 may manage the selection of portions of the hardware server 102 and their temporary assignment to portions of the virtual servers 112, 113.

In the system 100, a particular I/O adapter of the I/O adapters 136-138 may be virtually divided to enable the particular I/O adapter to be used by more than one virtual server. For example, the virtual server 112 may use a virtual I/O adapter that is hosted by one of the hardware I/O adapters 136-138. The hypervisor 110 may create and subdivide an address translation table 140. The hypervisor 110 may assign each virtual I/O adapter a portion of the subdivided address translation table 140 to enable the virtual I/O adapters to perform DMA I/O operations to the virtual memory of the virtual servers 112, 113.

Figure 2:
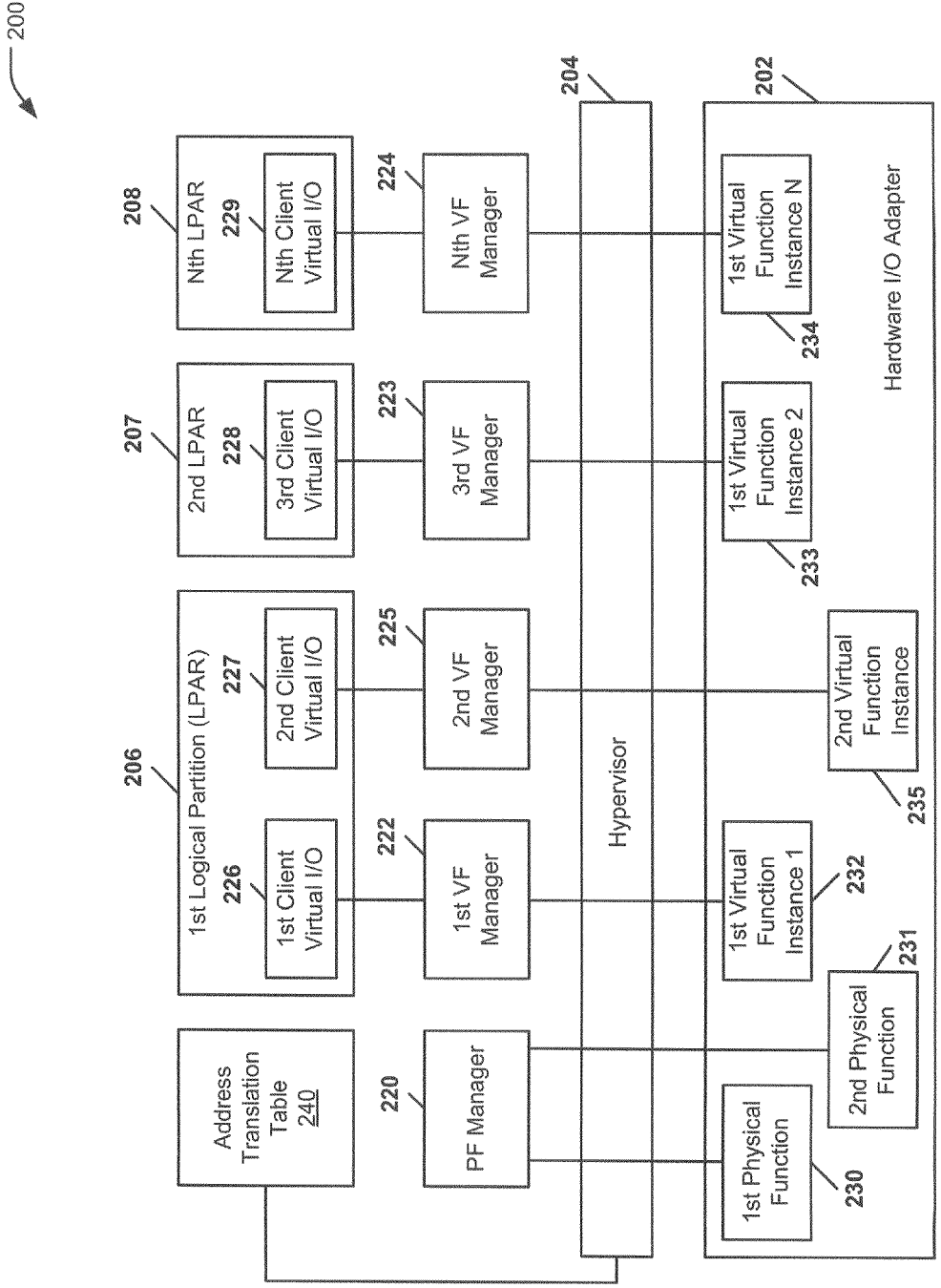
FIG. 2 is a block diagram of a second embodiment of a system that includes an address translation table to enable virtualized functions to access the memory of logical partitions.

Referring to FIG. 2, a block diagram of a second embodiment of a system that includes an address translation table to enable virtualized functions to access the memory of logical partitions is depicted and generally designated 200. In the system 200, a hypervisor 204 may enable multiple logical partitions to access virtual functions provided by hardware that includes a hardware I/O adapter 202. For example, the hypervisor 204 may enable a first logical partition 206, a second logical partition 207, and an Nth logical partition 208, to access virtual functions 232-235 that are provided by the hardware I/O adapter 202. To illustrate, the hypervisor 204 may use a first physical function 230 of the hardware I/O adapter 202 to provide a first instance of a first virtual function 232, a second instance of a first virtual function 233, and an Nth instance of a first virtual function 234 to the logical partitions 206-208. The hypervisor 204 may use a second physical function 231 of the hardware I/O adapter 202 to provide a second virtual function 235 to the logical partitions 206-208.

The physical functions 230, 231 may include peripheral component interconnect (PCI) functions that support single root I/O virtualization capabilities (SR-IOV). Each of the virtual functions 232-235 may be associated with one of the physical functions 230, 231 and may share one or more physical resources of the hardware I/O adapter 202.

Software modules, such as a physical function (PF) manager 220 and virtual function (VF) managers 222-225, may assist the hypervisor in managing the physical functions 230, 231 and the virtual functions 232-235. In a particular embodiment, the PF managers may be referred to as PF adjuncts and the VF managers may be referred to as VF adjuncts. For example, a user may specify a particular configuration and the PF manager 220 may configure the virtual functions 232-235 from the physical functions 230, 231 accordingly. The VF managers 222-225 may function as virtual device drivers. For example, just as a device driver for a physical device may enable a client application to access the functions of the device, each of the VF managers 222-225 may enable a client application to access the virtual functions 232-235. In the system 200, the VF managers 222 and 224-225 may enable access to the first virtual function instances 232 and 234-235, and the second VF manager 225 may enable access to the second virtual function 235.

The hypervisor 204 may allocate an address translation table 240 and assign the address translation table to the hardware I/O adapter 202. The hypervisor 204 may subdivide the address translation table into portions and assign each of the portions to one or more of the virtual function instances 232-235. For example, the hypervisor 204 may assign a first portion (not shown) of the subdivided address translation table 240 to the first instance of the first virtual function 232 and assign a second portion (not shown) of the subdivided address translation table 240 to the instance of the second virtual function 235. The instance of the first virtual function 232 may access the memory of the first client virtual I/O 226 via the first portion of the subdivided address translation table 240. The instance of the second virtual function 235 may access the memory of the second client virtual I/O 227 via the second portion of the subdivided address translation table 240.

In operation, the PF manager 220 may enable the first virtual function instances 232-234 from the first physical function 230. The PF manager 220 may enable the second virtual function 235 from the second physical function 231. The virtual functions 232-235 may be enabled based on a user provided configuration. Each of the logical partitions 206-208 may execute an operating system (not shown) and client applications (not shown). The client applications that execute at the logical partitions 206-208 may perform virtual input/output operations. For example, a first client application executing at the first logical partition 206 may include first client virtual I/O 226, and a second client application executing at the first logical partition 206 may include a second client virtual I/O 227. The first client virtual I/O 226 may access the first instance of the first virtual function 232 via the first VF manager 222. The second client virtual I/O 227 may access the second virtual function 235 via the second VF manager 225. A third client virtual I/O 228 executing at the second logical partition 207 may access the second instance of the first virtual function 233 via the third VF manager 223. An Nth client virtual I/O 229 executing at the Nth logical partition 208 may access the Nth instance of the first virtual function 233 via the Nth VF manager 224.

Thus, the hypervisor 204 may enable the client virtual I/Os 226-229 to access the virtual functions 232-235 that are associated with the physical functions 230, 231 of the hardware I/O adapter 202. The virtual functions 232-235 of the hardware I/O adapter 202 may be dynamically assigned, as described below, without having to remove and recreate the logical partitions 206-208.

It will be appreciated by one skilled in the art that the present invention is equally suited to embodiments that do not utilize a virtual function (VF) manager and client virtual I/O to enable a logical partition (LPAR) to access a virtual function, and instead enable a device driver within an LPAR to directly manage the virtual function.

Figure 3:
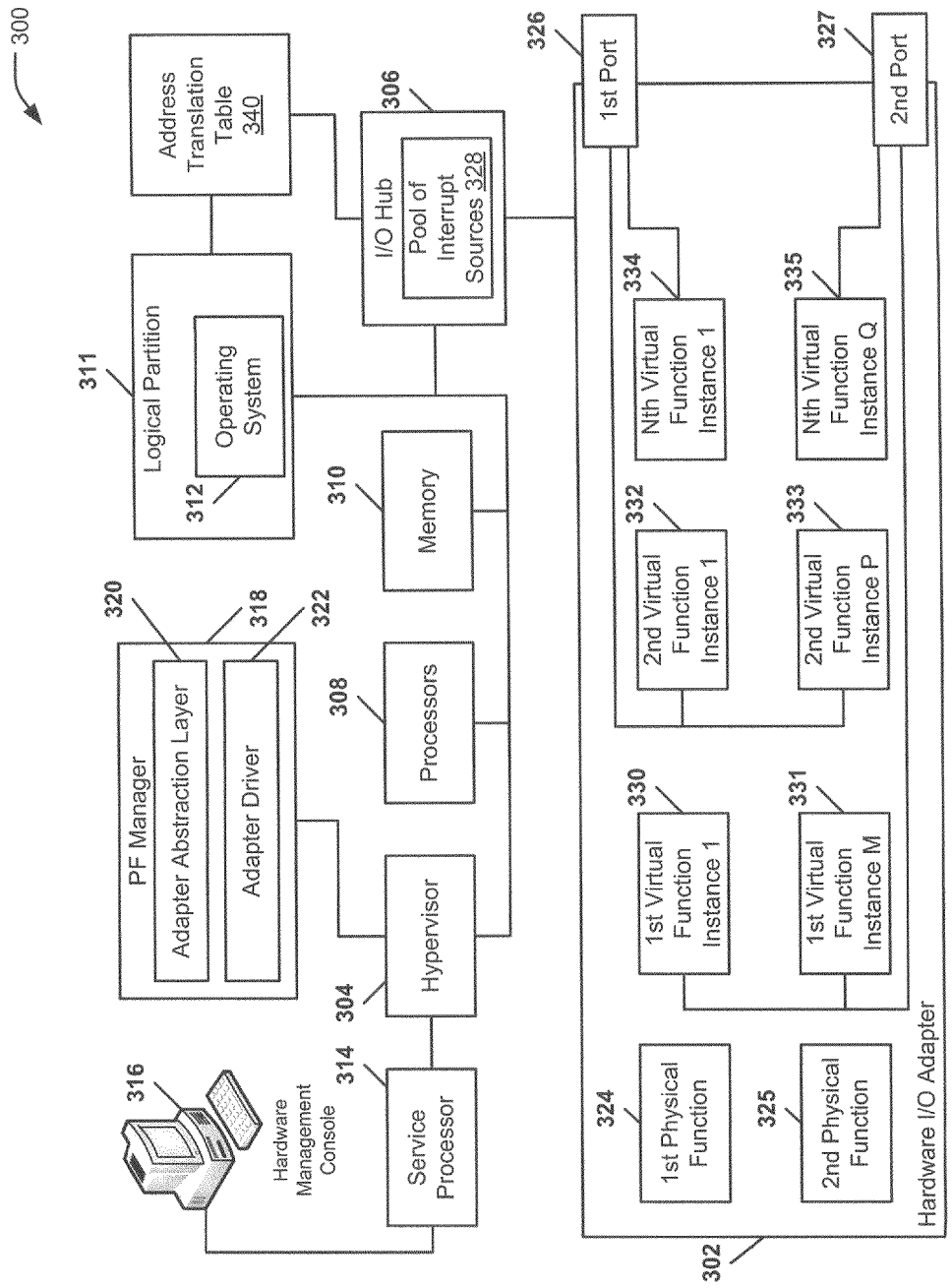
FIG. 3 is a block diagram of a third embodiment of a system that includes an address translation table to enable virtualized functions to access the memory of logical partitions.

Referring to FIG. 3, a block diagram of a third embodiment of a system that includes an address translation table to enable virtualized functions to access memory of logical partitions is depicted and generally designated 300. In the system 300, a hypervisor 304 may be coupled to hardware devices, such as a hardware I/O adapter 302, an I/O hub 306, processors 308, and a memory 310. The hypervisor 304 may be coupled to a logical partition 311 that executes an operating system 312. The hypervisor 304 may enable the logical partition 311 to access virtual functions associated with the hardware I/O adapter 302. A physical function (PF) manager 318 may be coupled to the hypervisor 304 to manage the physical functions of the hardware I/O adapter 302. A hardware management console 316 may be coupled to the hypervisor 304 via a service processor 314.

The service processor 314 may be a microcontroller that is embedded in a hardware server (e.g., the hardware server 102 of FIG. 1) to enable remote monitoring and management of the hardware server via the hardware management console 316. For example, the hardware management console 316 may be used by a system administrator to specify a configuration of hardware devices, such as specifying virtual functions of the hardware I/O adapter 302. The PF manager 318 may configure virtual functions of the hardware I/O adapter 302 based on configuration information provided by a system administrator via the hardware management console 316.

The hypervisor 304 may enable hardware devices, such as the hardware I/O adapter 302, to be logically divided into virtual resources and accessed by one or more logical partitions (e.g., the N logical partitions 206-208 of FIG. 2). The I/O hub 306 may include a pool of interrupt sources 328. The hypervisor 304 may associate at least one interrupt source from the pool of interrupt sources 328 with each virtual function of the hardware I/O adapter 302.

The I/O hub 306 may be a hardware device (e.g., a microchip on a computer motherboard) that is under the control of the hypervisor 304. The I/O hub 306 may enable the hypervisor to control I/O devices, such as the hardware I/O adapter 302.

The processors 308 may include one more processors, such as central processing units (CPUs), digital signal processors (DSPs), other types of processors, or any combination thereof. One or more of the processors 308 may be configured in a symmetric multiprocessor (SMP) configuration.

The memory 310 may include various types of memory storage devices, such as random access memory (RAM) and disk storage devices. The memory 310 may be used to store and retrieve various types of data. For example, the memory 310 may be used to store and to retrieve operational instructions that are executable by one or more of the processors 308.

The operating system 312 may execute within the logical partition 311. The virtual I/O of client applications (e.g., the client virtual I/Os 226-229 of FIG. 2) that execute using the operating system 312 may access virtual functions of the hardware I/O adapter 302. The hypervisor 304 may use the I/O hub 306 to connect to and control I/O devices, such as the hardware I/O adapter 302.

The PF manager 318 may include an adapter abstraction layer 320 and an adapter driver 322. The adapter abstraction layer 320 may include a generic abstraction to enable configuration of physical functions and virtual functions of the hardware I/O adapter 302. The adapter driver 322 may be specific to each particular model of hardware adapter. The adapter driver 322 may be provided by a manufacturer of the hardware I/O adapter 302.

The hardware I/O adapter 302 may include physical functions and ports, such as a first physical function 324, a second physical function 325, a first port 326, and a second port 327. The PF manager 318 may configure virtual functions based on the physical functions 324, 325 and associate the virtual functions with one or more of the ports 326, 327 of the hardware I/O adapter 302. For example, the PF manager 318 may configure the first physical function 324 to host multiple instances of a first virtual function, such as the first instance of the first virtual function 330 and the Mth instance of the first virtual function 331, where M is greater than 1. The instances of the first virtual function 330, 331 may be associated with the second port 327. The PF manager 318 may configure the second physical function 325 to host multiple instances of a second virtual function, such as the first instance of the second virtual function 332 and the Pth instance of the second virtual function 333, where P is greater than 1. The instances of the second virtual function 332, 333 may be associated with the first port 326. The PF manager 318 may configure multiple instances of an Nth virtual function, such as the first instance of the Nth virtual function 334 and the Qth instance of the Nth virtual function 335, where N is greater than 2, and Q is greater than 1. The instances of the Nth virtual function 334, 335 may be associated with the second port 327. The instances of the Nth virtual function 334, 335 may be hosted by a physical function, such as one of the first physical function 324, the second physical function 325, and another physical function (not shown).

The hypervisor 304 may thus enable access to the virtual functions 330-335 that are associated with the physical functions 324, 325 of the hardware I/O adapter 302. The virtual functions 330-335 of the hardware I/O adapter 302 may be dynamically assigned, as described below.

Figure 4:
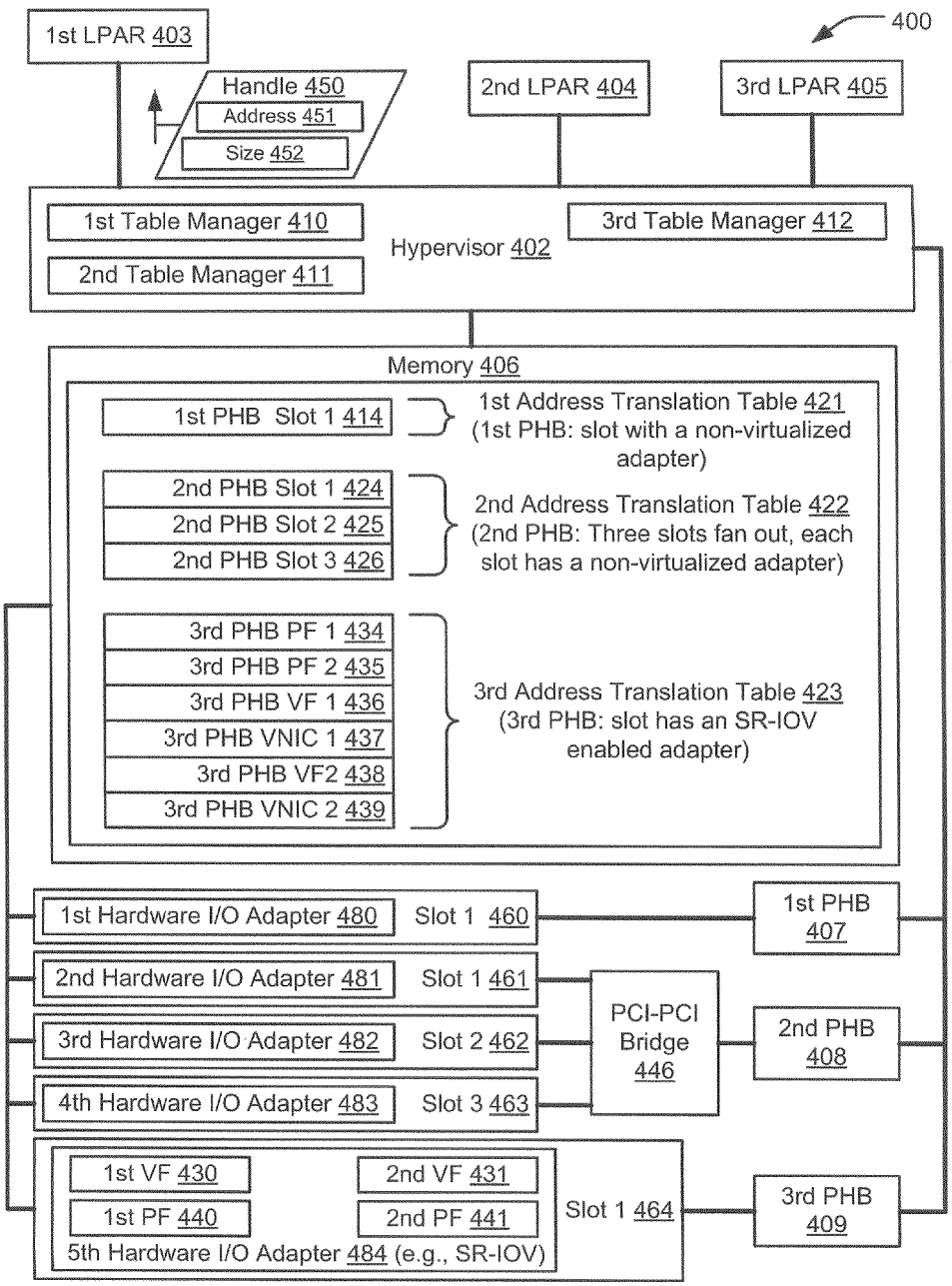
FIG. 4 is a block diagram of a fourth embodiment of a system that includes an address translation table to enable virtualized functions to access the memory of logical partitions.

Referring to FIG. 4, a block diagram of a fourth embodiment of a system that includes an address translation table to enable virtualized functions to access the memory of logical partitions is depicted and generally designated 400. The system 400 includes a hypervisor 402 coupled to one or more logical partitions, such as logical partitions (LPARs) 403, 404, and 405, to a memory 406, and to one or more peripheral component interconnect (PCI) host bridges (PHBs), such as a PHB 407, a PHB 408, and a PHB 409.

The hypervisor 402 may enable the LPARs 403-405 to access hardware resources, such as hardware I/O adapters 480-484 via the PHBs 406-408. The hypervisor 402 may create one or more address translation tables (e.g., the address translation tables 421-423) in the memory 406. The hypervisor 404 may create a table manager 410 (also referred to as a management object) to manage the address translation tables 421-423. For example, the table manager 410 may add a corresponding entry in one of the address translation tables 421-423 after a particular hardware I/O adapter is added to the system 400 and may delete the corresponding entry in one of the address translation tables 421-423 after the particular hardware I/O adapter is removed from the system 400.

Each of the PHBs 407-409 may enable access to hardware devices via slots on a bus (not shown). The bus may be a PCI bus, a PCI express (PCI) bus, another type of bus, or any combination thereof. For example, the first PHB 407 may be coupled via the bus to slots (e.g., a first slot 460) for plugging in hardware devices, such as the first hardware I/O adapter 480. The second PHB 408 may be coupled via the bus to a PCI-PCI bridge 446 to provide additional slots, such as a first slot 461, a second slot 462, and a third slot 463. The third PHB 409 may be coupled via the bus to slots (e.g., a first slot 464) for plugging in hardware devices, such as the fifth hardware I/O adapter 484.

Different types of hardware devices may be plugged into the slots 460-464. In the system 400, the hardware I/O adapters 480-483 may be non-virtualized I/O adapters. For example, one or more of the hardware I/O adapters 480-483 may be unable to provide virtual functions. As another example, one or more of the hardware I/O adapters 480-483 may be capable of providing virtual functions, but this capability may not be enabled. The non-enabled hardware I/O adapters may behave as non-virtualized I/O adapters.

In the system 400, the fifth hardware I/O adapter 484 may be an adapter that is capable of providing virtual functions, such as a single root I/O virtualized (SR-IOV) adapter. The capability of providing virtual functions may be enabled in the fifth hardware I/O adapter 484. The fifth hardware I/O adapter 484 may provide virtual functions that are hosted by physical functions, such as a first virtual function (VF) 430 that is hosted by a first physical function (PF) 440, and a second VF 431 that is hosted by a second PF 441.

In a computer system, such as the system 400, a discovery process may be used to find new resources or to find changes to existing resources. The resources may be hardware resources, software resources, other types of resources, or any combination thereof. The discovery process may be performed as part of a boot sequence after the computer system is initially started up or after the computer system is restarted.

In operation, the hypervisor 402 may detect the first PHB 407. For example, the hypervisor 402 may detect the first PHB 407 during a discovery process. The hypervisor 402 may allocate the first address translation table 421 and may assign the first address translation table 421 to the first PHB 407. The hypervisor 402 may add an entry 414 to the first address translation table 421 that corresponds to the first slot 460. The hypervisor 402 may determine that the first hardware I/O adapter 480 is associated with the first PHB 407 via the first slot 460. The hypervisor 402 may determine that the first hardware I/O adapter 480 is a non-virtualized adapter. The hypervisor 402 may create a table manager 410 to manage the first address translation table 421 that is associated with the first PHB 407.

The hypervisor 402 may detect the second PHB 408 during the discovery process. The hypervisor 402 may allocate the second address translation table 422 and may assign the second address translation table 422 to the second PHB 408. The hypervisor 402 may determine that the hardware I/O adapters 481-483 are associated with the second PHB 408 via the slots 461-463. The hypervisor 402 may determine that the hardware I/O adapters 481-483 are non-virtualized adapters. The hypervisor 402 may subdivide the second address translation table 422 based on one or more physical properties that are associated with the second PHB 408. For example, the hypervisor 402 may subdivide the second address translation table 422 based on a number of the slots 461-463 that are provided by the PCI-PCI bridge 446 that is coupled to the second PHB 408. To illustrate, the hypervisor 402 may create entries 424, 425, and 426 in the second address translation table 422 that correspond to the slots 461, 462, and 463, respectively. The hypervisor 402 may create a second table manager 411 to manage the second address translation table 422 that is associated with the second PHB 408.

The hypervisor 402 may detect the third PHB 409 during the discovery process. The hypervisor 402 may allocate the third address translation table 423 and assign the third address translation table 423 to the third PHB 409. The hypervisor 402 may determine that the fifth hardware I/O adapter 484 is associated with the third PHB 409 via the slot 464. The hypervisor 402 may determine that the fifth hardware I/O adapter 484 is a virtualized adapter (i.e., the virtualized capabilities of the hardware I/O adapter 484 have been enabled). For example, the hypervisor 402 may determine that the fifth hardware I/O adapter 484 is configured as an SR-IOV adapter. The hypervisor 402 may subdivide the third address translation table 423 based on virtualized capabilities of the fifth hardware I/O adapter 484. For example, the hypervisor 402 may subdivide the third address translation table 423 based on: a number of physical functions (i.e., the PFs 440-441) provided by the fifth hardware I/O adapter 484, a number of virtual functions (i.e., the VFs 430-431) provided by the fifth hardware I/O adapter 484, a number of virtual network interface cards (VNICs) provided by the fifth hardware I/O adapter 484, another physical or virtual function provided by the fifth hardware I/O adapter 484, or any combination thereof.

The hypervisor 402 may create entries 434, 435 of the third address translation table 423 that correspond to the physical functions 440, 441, create entries 436 and 438 that correspond to the virtual functions 430, 431, and create entries 437 and 439 that correspond to VNIC functions of the fifth hardware I/O adapter 484.

To enable an LPAR (e.g., one of the LPARs 403-405) to direct one of the virtual functions (e.g., one of the virtual functions 430-431) to perform DMA I/O operations to the LPAR memory, the hypervisor 402 may provide the LPAR with a way to access the translation table for the virtual function. For example, the hypervisor 402 may provide the first LPAR 403 a handle 450 to enable the first LPAR 403 to direct the DMA I/O operations of the first virtual function 430 to the memory of LPAR 403. The handle 450 may include an address 451, such as a starting DMA address to enable the first virtual function 430 to access the memory of the first LPAR 403 via DMA. The handle 450 may include a size 452 of a portion of the third address translation table 423 that is associated with and may be used by the first virtual function 430 to access the memory of the first LPAR 403.

The hypervisor 402 may create a third table manager 412 to manage the third address translation table 423 that is associated with the third PHB 409. If a table manager was previously created and assigned to manage a translation table of one or more non-virtualized hardware I/O adapter, the hypervisor 402 may delete the old table manager and create a new table manager (e.g., the third table manager 412) to manage a virtualized hardware I/O adapter, such as the fifth hardware I/O adapter 484.

The hypervisor 402 may thus detect PHBs (e.g., the PHBs 407-409) and detect hardware I/O adapters (e.g., the hardware I/O adapters 480-484) that are coupled to the PHBs via a bus (e.g., a PCIe bus). The hypervisor 402 may allocate and subdivide an address translation table (e.g., one of the address translation tables 421-423) based on the number of hardware I/O adapters that are coupled to the PHBs and based on whether the hardware I/O adapters are capable of providing virtualized functions (e.g., SR-IOV adapters). The hypervisor 402 may create a particular type of table manager based on the number of hardware I/O adapters that are coupled to the PHBs and based on whether the hardware I/O adapters are capable of providing virtualized functions. For example, in FIG. 4, the first table manager 410 may be capable of managing an address translation table (e.g., the first address translation table 421) for a hardware I/O adapter that does not have virtualization capabilities. The second table manager 411 may be capable of managing an address translation table (e.g., the second address translation table 422) that is subdivided based on physical aspects of multiple hardware I/O adapters that are accessible to a particular PHB. The third table manager 412 may be capable of managing an address translation table (e.g., the third address translation table 423) that is divided based on virtual aspects of a virtualization-enabled I/O adapter that is accessible to a particular PHB.

Figure 5:
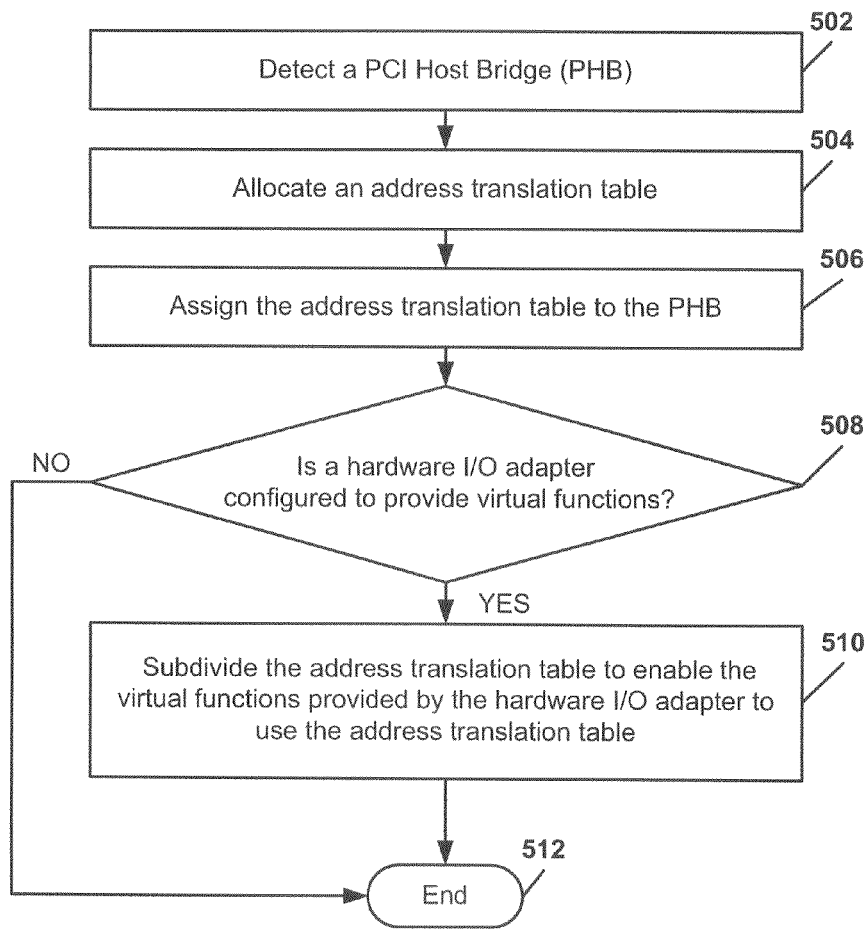
FIG. 5 is a flow diagram of a first method to enable virtualized functions to access the memory of logical partitions via an address translation table.

Referring to FIG. 5, a flow diagram of a first method to enable access to virtualized functions via an address translation table is depicted. The method may be performed by a hypervisor, such as the hypervisor 110 of FIG. 1, the hypervisor 204 of FIG. 2, the hypervisor 302 of FIG. 3, and the hypervisor 402 of FIG. 4.

A PCI Host Bridge (PHB) may be detected, at 502. Moving to 504, an address translation table, such as one of the address translation tables 421-423 of FIG. 4, may be allocated. Advancing to 506, the address translation table may be assigned to the PHB. For example, in FIG. 4, the first address translation table 421 may be assigned to the first PHB 421, and the second address translation table 422 may be assigned to the second PHB 422. The third address translation table 423 may be assigned to the third PHB 423.

Proceeding to 508, the hypervisor may determine whether an I/O adapter is configured to provide virtual functions (e.g., configured as an SR-IOV adapter). For example, in FIG. 4, after detecting the third PHB 409, the hypervisor 402 may determine whether the fifth I/O adapter that is accessible to the third PHB 409 is capable of providing virtual functions. In response to determining that the I/O adapter is configured to provide virtual functions, the address translation table may be subdivided to enable the virtual functions provided by the hardware I/O adapter to use the address translation table. For example, the third address translation table 423 of FIG. 4 may be subdivided based on physical functions and virtual functions provided by the fifth hardware I/O adapter 484.

A hypervisor may thus detect a PHB and one or more hardware I/O adapters that are accessible to the PHB. The hypervisor may subdivide the address translation to support the virtualized functions in response to determining that at least one or more hardware I/O adapters are capable of providing virtualized functions. For example, the hypervisor may subdivide the address translation table based on: a number of virtual functions configured by a user via a hardware management console (e.g., the hardware management console 316 of FIG. 3), a number of physical functions provided by the hardware I/O adapter, a number of virtual functions provided by the hardware I/O adapter, a number of virtual network interface cards (VNICs) provided by the hardware I/O adapter, another physical function provided by the hardware I/O adapter, another virtual function provided by the hardware I/O adapter, or any combination thereof. The hypervisor may create a table manager to manage the subdivided address translation table. If the hypervisor had previously created a table manager to manage a translation table for a non-virtualized hardware I/O adapter, the hypervisor may delete the old table manager and create a new table manager to manage a virtualized hardware I/O adapter.

Figure 6:
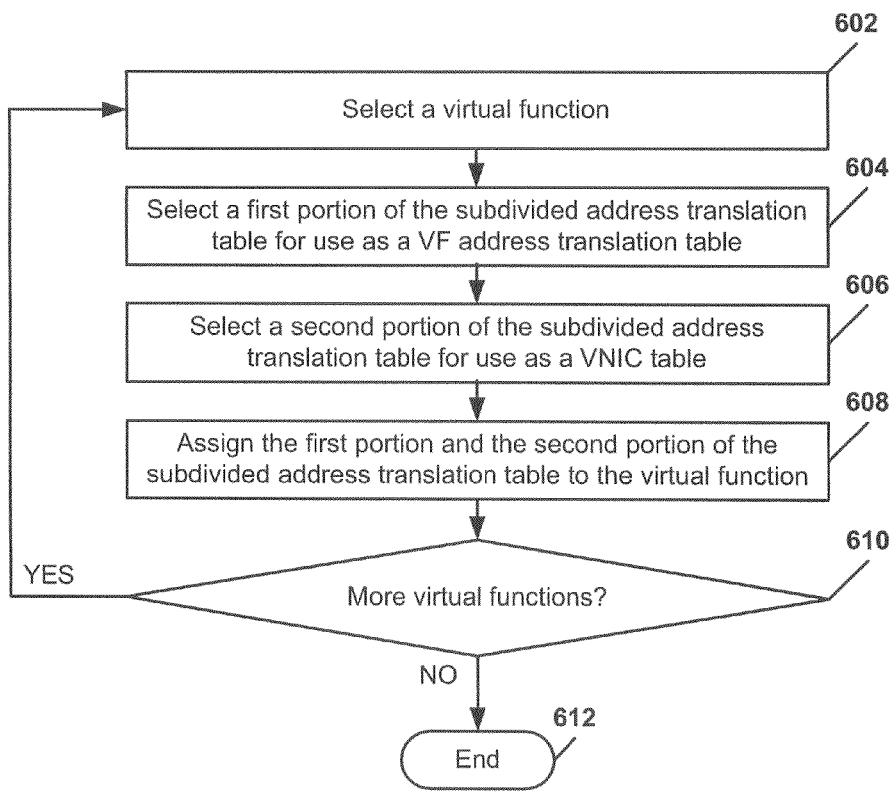
FIG. 6 is a flow diagram of a second method to enable virtualized functions to access the memory of logical partitions via an address translation table.

Referring to FIG. 6, a flow diagram of a second method to enable access to virtualized functions via an address translation table is depicted. The method may be performed by a hypervisor, such as the hypervisor 110 of FIG. 1, the hypervisor 204 of FIG. 2, the hypervisor 302 of FIG. 3, and the hypervisor 402 of FIG. 4.

A virtual function that is provided by the virtualized I/O adapter (e.g., an SR-IOV enabled adapter) may be selected, at 602. Moving to 604, a first portion of the subdivided address translation table may be selected for use as a virtual function (VF) address translation table. The VF address translation table may enable a virtual function to use direct memory access (DMA) to access the memory of the logical partition.

Proceeding to 606, a second portion of the subdivided address translation table may be selected for use as a virtual network interface card (VNIC) table. Advancing to 608, the first portion and the second portion of the subdivided address translation table may be assigned to the virtual function. For example, the first portion and the second portion of the subdivided address translation table may be used to perform address translation when the logical partition memory is accessed by a virtual function.

Continuing to 610, a determination may be made whether there are more virtual functions. If there are more virtual functions, the method may proceed to 602 where another virtual function is selected. If there are no more virtual functions, the method may end, at 612.

A hypervisor may thus assign portions of the subdivided address translation table for use by each virtual function that is provided by the virtualized I/O adapter. A first portion of the subdivided address translation table may be assigned to a virtual function for use as a VF address translation table. A second portion of the subdivided address translation table may be assigned to the virtual function for use as a VNIC table. A logical partition may receive a first handle and a size of the VF address translation table to enable access to the VF address translation table. The logical partition may receive a second handle (e.g., a pointer) and a size of the VNIC table to enable access to the VNIC table. In a particular embodiment, the logical partition may receive a starting DMA address of the VF address translation table and a starting DMA address of the VNIC table.

Figure 7:
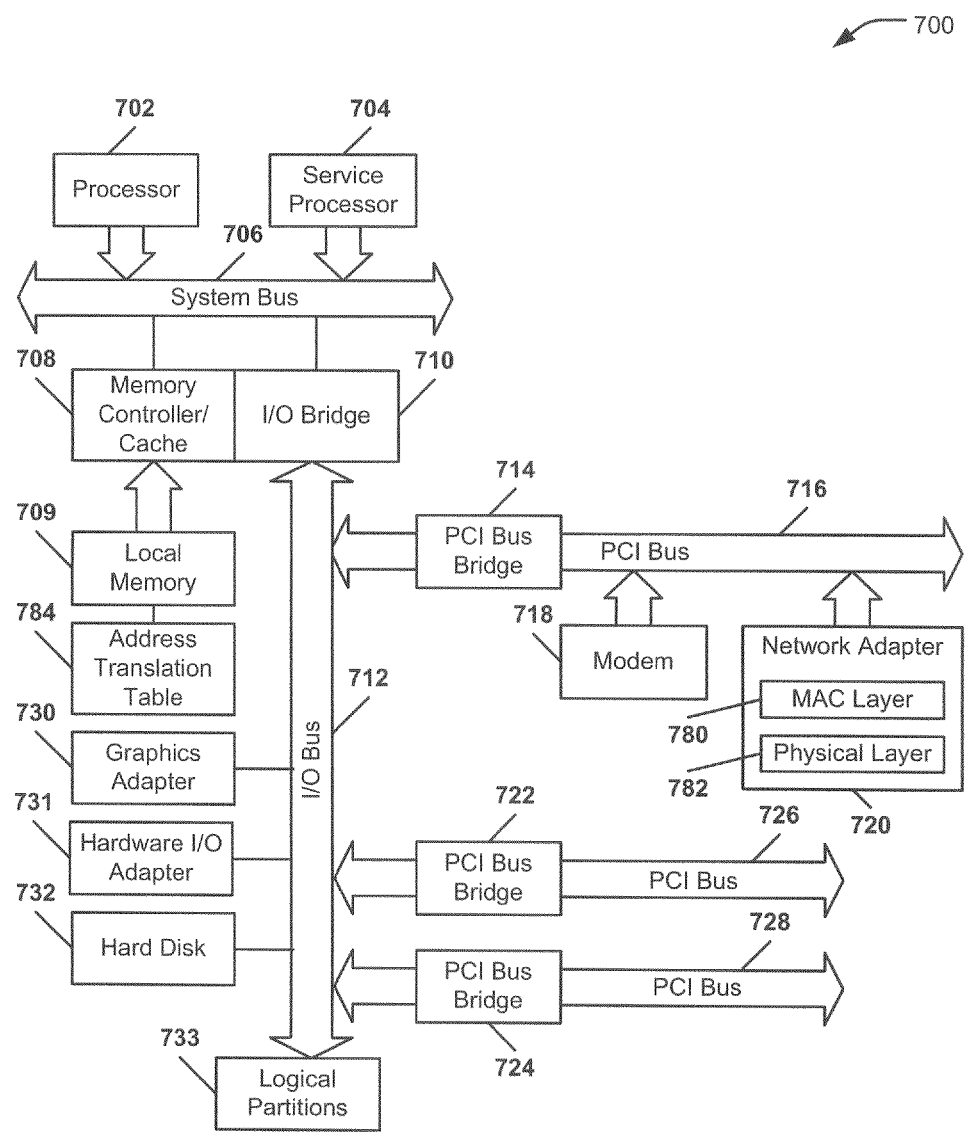
FIG. 7 is a block diagram of an illustrative embodiment of a general computer system.

Referring to FIG. 7, a block diagram of an illustrative embodiment of a general computer system is depicted and generally designated 700. The data processing system 700 may be a symmetric multiprocessor (SMP) system that includes a plurality of shared processors or SMT-capable processors, such as processors 702 and 704 connected to system bus 706. Alternatively, a single processor system may be employed. In the depicted example, processor 704 may be a service processor. Each SMT-capable processor may be capable of concurrently executing multiple hardware threads on the one processor.

Connected to system bus 706 may be memory controller/cache 708, which provides an interface to local memory 709. An address translation table 784 may be located in the local memory 709. The address translation table 784 may enable logical partitions 733 to access virtual functions of a hardware I/O adapter 731. An I/O bus bridge 710 may be connected to a system bus 706 to provide an interface to I/O bus 712. A memory controller/cache 708 and an I/O bus bridge 710 may be integrated as depicted.

A peripheral component interconnect (PCI) bus bridge 714 connected to I/O bus 712 may provide an interface to PCI local bus 716. In FIG. 7, the term PCI in this application may also refer to variations and extensions of PCI, such as PCI express (PCIe). Multiple modems may be connected to PCI bus 716. Typical PCI bus implementations may support PCI expansion slots or add-in connectors. Communications links to network computers may be provided via modem 718 and network adapter 720 connected to PCI local bus 716 through add-in boards.

Network adapter 720 may include a physical layer 782 which enables analog signals to go out to a network, such as for example, an Ethernet network via an R45 connector. A media access controller (MAC) 780 may be included within network adapter 720. Media access controller (MAC) 780 may be coupled to bus 716 and processes digital network signals. MAC 780 may serve as an interface between bus 716 and physical layer 782. MAC 780 may perform a number of functions involved in the transmission and reception of data packets. For example, during the transmission of data, MAC 780 may assemble the data to be transmitted into a packet that includes address and error detection fields. During the reception of a packet, MAC 780 may disassemble the packet and perform address checking and error detection. In addition, MAC 780 may perform encoding/decoding of digital signals prior to transmission, perform preamble generation/removal, and bit transmission/reception.

Additional PCI bus bridges 722 and 724 may provide interfaces for additional PCI buses 726 and 728, from which additional modems or network adapters may be supported. In this manner, data processing system 700 may allow connections to multiple network computers. A memory-mapped graphics adapter 730 and hard disk 732 may be directly or indirectly connected to I/O bus 712.

Service processor 704 may interrogate system processors, memory components, and I/O bridges to generate and inventory the system 700. Service processor 704 may execute Built-In-Self-Tests (BISTs), Basic Assurance Tests (BATs), and memory tests on one or more of the elements in the system 700. Any error information for failures detected during the BISTs, BATs, and memory tests may be gathered and reported by service processor 704.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments, including embodiments of I/O adapters virtualized in multi-root input/output virtualization (MR-IOV) embodiments, or virtualized using software virtualization intermediaries, will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A computer-implemented method for managing address translation tables created to enable one or more input/output (I/O) adapters attached to one or more peripheral component interconnect (PCI) host bridges (PHBs) to perform I/O operations to and from respective memories of one or more logical partitions of a virtualized system, the method comprising:
    detecting each of the one or more PHBs as part of a discovery process performed by a virtualized intermediary of the virtualized system, the discovery process further comprising, for each detected PHB:
    allocating and assigning an address translation table to the detected PHB;
    determining whether an I/O adapter is attached to the detected PHB;
    in response to determining that the I/O adapter is attached to the detected PHB, creating a first table manager of a first type to manage the address translation table, wherein a table manager of the first type is configured to manage an address translation table assigned to a PHB attached to a non-virtualized I/O adapter, and wherein managing an address translation table comprises adding and removing entries in the managed address translation table corresponding to hardware I/O adapters added and removed from the assigned PHB;
    determining whether the I/O adapter is virtualized I/O adapter configured to provide virtual functions; and
    in response to determining that the I/O adapter is a virtualized I/O adapter, sub-dividing the address translation table into a plurality of sub-address translation tables, each of the sub-address translation tables assigned to a respective one of the virtual functions, deleting the first table manager, and creating a second table manager of a second type to manage the sub-divided address translation table, wherein a table manager of the second type is configured to manage an address translation table assigned to a PHB attached to a virtualized I/O adapter.

2. The computer-implemented method of claim 1, wherein the address translation tables are allocated at a local memory that is accessible to the virtualized intermediary.

3. An apparatus comprising:
    a processor;
    one or more peripheral component interconnect (PCI) host bridges (PHBs) accessible by the processor; and
    a memory storing program code, the program code executable by the processor to configure a virtualized system comprising a plurality of logical partitions managed by a virtualization intermediary and to manage address translation tables created to enable one or more input/output (I/O) adapters attached to the PHBs to perform I/O operations to and from respective memories of the logical partitions, the managing including a discovery process which detects each of the PHBs and further comprises, for each detected PHB:
    allocating and assigning an address translation table to the detected PHB;
    determining whether an I/O adapter is attached to the detected PHB;
    in response to determining that the I/O adapter is attached to the detected PHB, creating a first table manager of a first type to manage the address translation table, wherein a table manager of the first type is configured to manage an address translation table assigned to a PHB attached to a non-virtualized I/O adapter, and wherein managing an address translation table comprises adding and removing entries in the managed address translation table corresponding to hardware I/O adapters added and removed from the assigned PHB;
    determining whether the I/O adapter is a virtualized I/O adapter configured to provide virtual functions; and
    in response to determining that the I/O adapter is a virtualized I/O adapter, sub-dividing the address translation table into a plurality of sub-address translation tables, each of the sub-address translation tables assigned to a respective one of the virtual functions, deleting the first table manager, and creating a second table manager of a second type to manage the sub-divided address translation table, wherein a table manager of the second type is configured to manage an address translation table assigned to a PHB attached to a virtualized I/O adapter.

4. The apparatus of claim 3, wherein the program code is further executable by the processor to associate one of the virtual functions with a logical partition of the plurality of logical partitions to enable direct memory access (DMA) between memory allocated to the logical partition and the virtualized I/O adapter.

5. A computer program product comprising a non-transitory computer readable storage device having computer usable program code embodied therewith, the computer usable program code executable by a processor to perform a process for managing address translation tables created to enable one or more input/output (I/O) adapters attached to one or more peripheral component interconnect (PCI) host bridges (PHBs) to perform I/O operations to and from respective memories of one or more logical partitions of a virtualized system, the process comprising:
    detecting each of the one or more PHBs as part of a discovery process performed by a virtualization intermediary of the virtualized system, the discovery process further comprising, for each detected PHB:
    allocating and assigning an address translation table to the detected PHB;
    determining whether an input/output (I/O) adapter is attached to the detected PHB;
    in response to determining that the I/O adapter is attached to the detected PHB, creating a first table manager of a first type to manage the address translation table, wherein a table manager of the first type is configured to manage an address translation table assigned to a PHB attached to a non-virtualized I/O adapter, and wherein managing an address translation table comprises adding and removing entries in the managed address translation table corresponding to hardware I/O adapters added and removed from the assigned PHB;
    determining whether the I/O adapter is a virtualized I/O adapter configured to provide virtual functions; and in response to determining that the I/O adapter is a virtualized I/O adapter, sub-dividing the address translation table into a plurality of sub-address translation tables, each of the sub-address translation tables assigned to a respective one of the virtual functions, deleting the first table manager, and creating a second table manager of a second type to manage the sub-divided address translation table, wherein a table manager of the second type is configured to manage an address translation table assigned to a PHB attached to a virtualized I/O adapter.

6. The computer program product of claim 5, wherein the program code is further executable by the processor to associate one of the virtual functions with a logical partition of the one or more logical partitions to enable direct memory access (DMA) between memory allocated to the logical partition and the virtualized I/O adapter.

* * * * *